United States Patent [19]

Pirilä

[11] Patent Number: 5,801,353
[45] Date of Patent: Sep. 1, 1998

[54] SUPERIMPOSED SHEET WELDING SYSTEM INCLUDING ROTATABLE WELDING ELECTRODE AND COOLING RINGS

[75] Inventor: Timo Mauno Pirilä, Kalanti as, Finland

[73] Assignee: Vahterus Oy, Kalanti, Finland

[21] Appl. No.: 732,281

[22] PCT Filed: May 3, 1997

[86] PCT No.: PCT/FI95/00237

§ 371 Date: Mar. 4, 1997

§ 102(e) Date: Mar. 4, 1997

[87] PCT Pub. No.: WO95/30511

PCT Pub. Date: Nov. 16, 1995

[30] Foreign Application Priority Data

May 4, 1994 [FI] Finland ................... 942054

[51] Int. Cl.⁶ .................... B23K 37/04; B23K 9/028
[52] U.S. Cl. .................... 219/86.31; 219/117.1; 219/125.11; 219/161
[58] Field of Search ............ 219/86.31, 86.9, 219/117.1, 125.1, 125.11, 137 R, 161; 29/454

[56] References Cited

U.S. PATENT DOCUMENTS

| | | |
|---|---|---|
| 3,100,256 | 8/1963 | Borg ........................... 29/454 |
| 3,640,116 | 2/1972 | Hellman ....................... 72/476 |
| 3,666,161 | 5/1972 | Keller ......................... 29/454 |
| 4,235,359 | 11/1980 | Ikuno et al. ................ 219/125.11 |
| 4,236,060 | 11/1980 | Butz ........................... 219/125.1 |
| 4,487,356 | 12/1984 | Krieger et al. ............... 228/46 |
| 4,500,026 | 2/1985 | Larsen ........................ 219/137 R |
| 4,758,706 | 7/1988 | Delquie ....................... 219/125.1 |

FOREIGN PATENT DOCUMENTS

| | | |
|---|---|---|
| 0528321 | 2/1993 | European Pat. Off. . |
| 0549385 | 6/1993 | European Pat. Off. . |
| 2360566 | 6/1974 | Germany . |

*Primary Examiner*—Gregory L. Mills
*Attorney, Agent, or Firm*—Ladas & Parry

[57] ABSTRACT

A method and apparatus for welding thin sheets (34) and (35) at the periphery of aligned holes therein by melting the sheets together by a rotating electrode (23) in a protective gas atmosphere. The sheets (34) and (35) are pressed together by copper rings (32) and (33) which also function as heat transfer members to conduct the heat away from the welding seam and thus prevent distortion thereat. The electrode (23) is adjusted to the proper vertical position by a guide (9) in a jig (7), and it is locked to the position determined by the sheets (34) and (35) by a clamp (31).

12 Claims, 2 Drawing Sheets

10

SUPERIMPOSED SHEET WELDING SYSTEM INCLUDING ROTATABLE WELDING ELECTRODE AND COOLING RINGS

FIELD OF THE INVENTION

The invention relates to a method and an apparatus for joining thin sheets at the circumferences of circular holes in the sheets. In the method of the invention no filler metal is used, instead the joint is welded by fusing the thin sheets together. The welding apparatus of the method comprises a welding machine, a welding jig, a rotating welding head and associated means for gas supply, and a power source.

BACKGROUND AND PRIOR ART

Electric welding methods for joining thin sheets are previously known. Such methods include e.g. spot and projection welding. In these methods the sheets are pressed against each other and a current is allowed to pass through the pressure point, whereby the melting of metal is sufficient for the joining. A disadvantage of spot welding is that the joints are spot-like. This means that water-proof or gas-proof seams, a prerequisite for a pressure vessel or like e.g. heat-exchanger structures, cannot be made. The use of projection welding for joining the edges of circular holes requires expensive equipment. Further, as pressure vessels are concerned, the above methods do not usually provide a sufficiently even and strong joint.

Welding and brazing methods using various filler metals, e.g. in the form of rods or strip, have been applied to joining the edges of holes in thin sheets. Even in these cases the cost of equipment and tools easily rises so that these methods cannot be used when small numbers of products are manufactured. The quality of the seam may also be inferior when filler metal is used. The seam becomes unequal in thickness and uneven. Additional problems may arise regarding penetration. Distortion of thin sheets in connection with welding is also a problem which is very difficult to control.

Even with modern methods, joining thin sheets by welding has proved rather problematic in several cases. The lack of suitable equipment and methods has resulted e.g. in frequent use of mechanical joining means, such as screws, rivets or the like in joining thin sheets. The main problems in welding together thin sheets are changes caused by thermal stress, which change the shapes of the structures. Another major problem has been that in thin sheet work it is difficult to control the melt, which has resulted in low-quality and unsatisfactory seams. Exact allocation of heat has also been problematic in several welding methods. Improper distribution of heat results in possible melting and sagging of metal, and therefore in an inferior seam. In methods being used, elimination of generated heat has not been sufficient, and therefore it has been necessary to limit, for example, the strength of the current very strictly.

SUMMARY OF THE INVENTION

The method and apparatus of the invention seek to provide decisive improvements to the above problems and shortcomings.

The main advantage of the method and apparatus of the invention may be considered to be its applicability to joining thin sheets at a hole irrespective of the sheet material. When thin sheets are joined by the method of the invention, they remain completely straight, and there are no changes caused by thermal stress. The seam produced by the method and apparatus is first-class and is suitable for use in e.g. pressure vessels. It is a further advantage that no filler metal is needed in the welding; an adequate quantity of the parent material is melted to ensure that the resulting seam is sufficiently strong. The seams of the invention do not sag, as excess heat is efficiently conducted away from the welding area. On the basis of the above the resulting melting zone is so narrow that sagging problems do not occur. The apparatus and method of the invention may easily be automatized, and the method is particularly well adaptable to mass production.

BRIEF DESCRIPTION OF THE DRAWINGS

In the following the invention will be described in greater detail with reference to the accompanying drawings.

DETAILED DESCRIPTION

Figure 1:
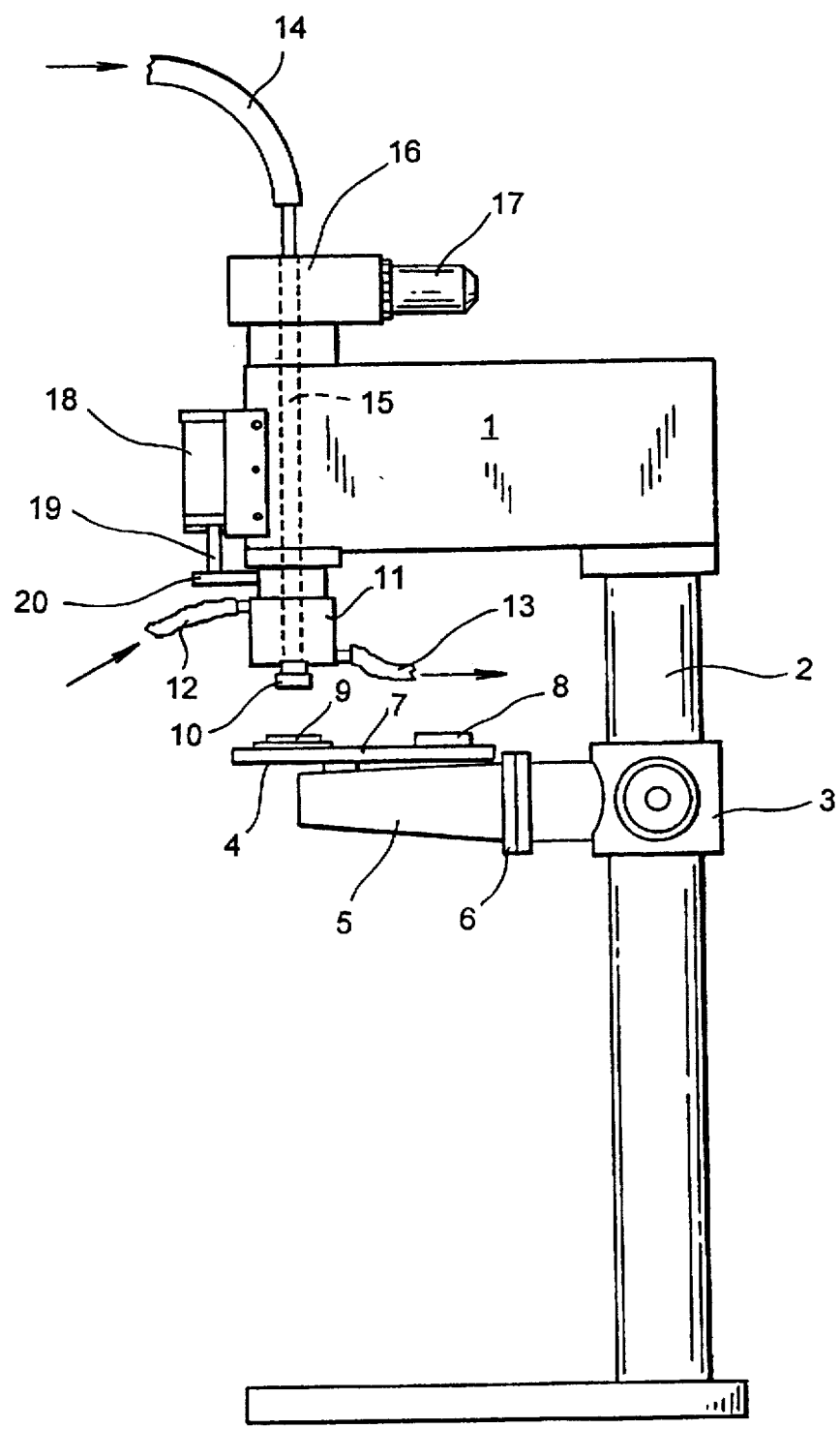
FIG. 1 is a side view of a welding machine according to the invention.
Figure 2:
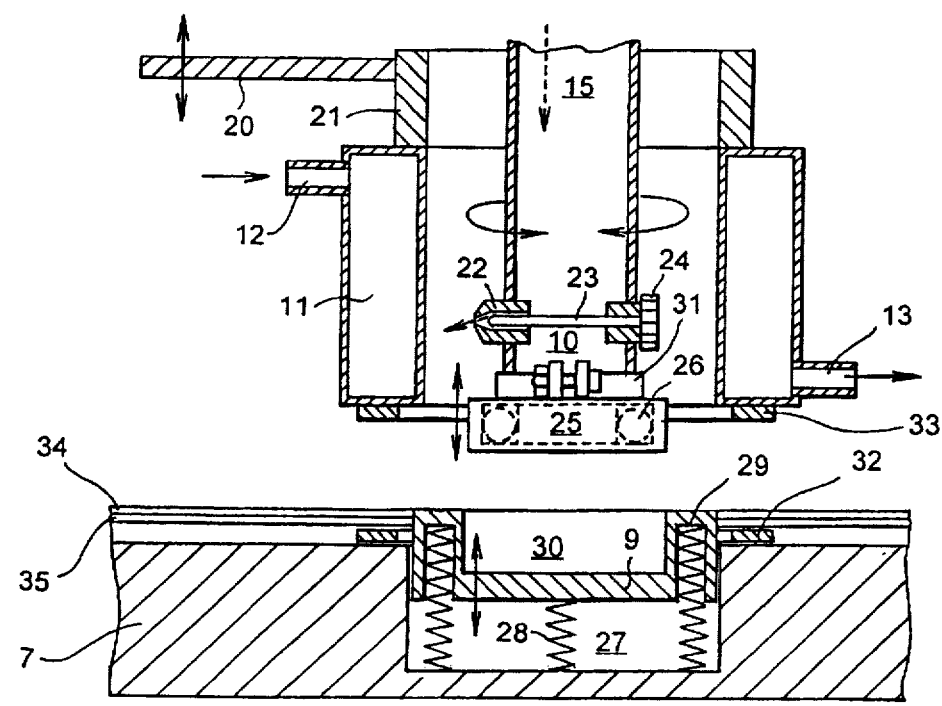
FIG. 2 is a side view and a partial cross section of a welding head of the machine in the initial position.
Figure 3:
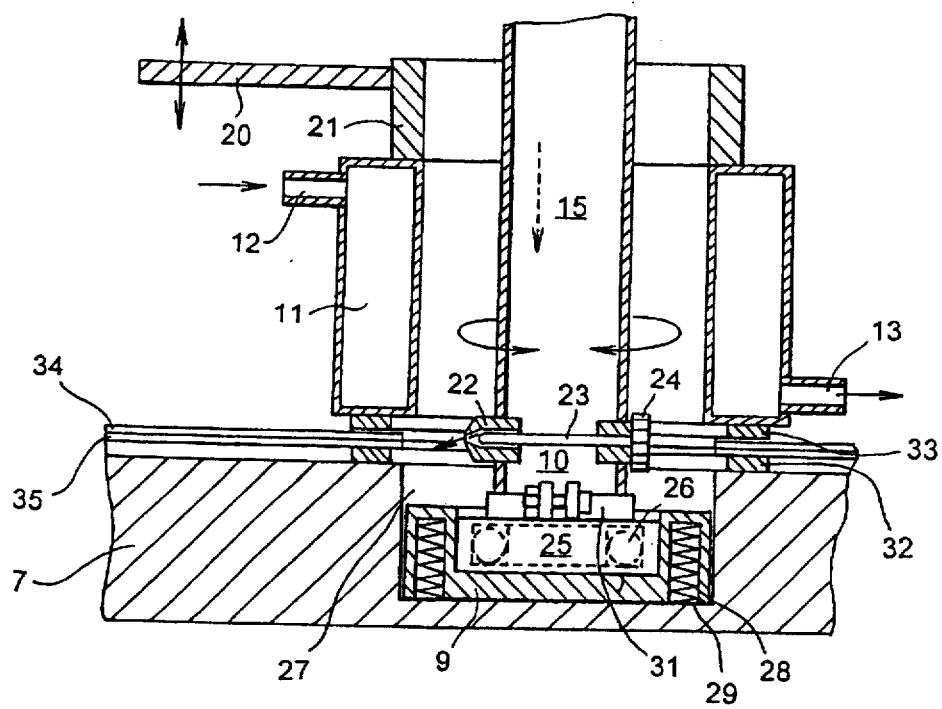
FIG. 3 is a side view and a partial cross section of a welding head in the welding position.

In FIG. 1, numeral 1 refers to a welding machine. A leg of the welding machine is denoted by numeral 2 and a mobile clamp thereon by numeral 3. The clamp is connected to a platen 4. A shank of the platen is denoted by numeral 5 and a joint by numeral 6. A welding jig is denoted by numeral 7 and guides thereon by numerals 8 and 9. Numeral 10 denotes a welding head and numeral 11 a cooler. A fitting for incoming water for the cooler 11 is denoted by numeral 12 and a discharge fitting by numeral 13. Numeral 14 denotes a protective gas conduit and numeral 15 a vertical axle. A switch 16 and an electric motor 17 rotate the vertical axle 15. The welding head 10 is raised and lowered by means of a pneumatic cylinder 18 whose shank 19 is connected via a bar 20 to the axle 15 and the welding head 10. In FIGS. 2 and 3 the numeral 21 refers to a junction ring coupled to the cooler 11. The welding head 10 comprises a nozzle 22 with an electrode 23 in the middle of the nozzle, the axial location of the electrode in the nozzle being adjusted by a screw 24. A part 25 of disc shape is attached to the lower portion of the axle 15 by a ball bearing 26. A blind, cylindrical hole 27 is milled in the jig 7 and the guide 9 is fitted therein for vertical travel between a lowered position at the bottom of the jig and a raised position therefrom. The guide 9 supports springs 28, in holes 29, which urge the guide to the upper position. The guide 9 has a central a recess 30 of the same as the cylindrical member 25. The member 25 descends into the recess 30 and simultaneously presses the guides 9 to the bottom of the jig 7. The cylinder 25 is vertically adjustable on axle 15 by means of a clamp 31, and it may be used to adjust the vertical position of the electrode 23 of the welding head 10.

The welding method of the invention is applied in the following manner. The holes in the sheets to be joined are placed one on the other by means of the guides 8 and 9. The vertical position of the electrode 23 of the welding head 10 is adjusted according to the seam at the mating surfaces of sheets 34 and 35. The cylindrical member 25, which positions the electrode 23, is aligned by means of the clamp 31.

When the sheets 34 and 35 to be joined have been placed one on the other by means of the guides 8 and 9, at the holes, the cooler 11 is pressed by means of the pneumatic cylinder 18 against the jig 7. The welding head 10 inside the cooler glides in place, and the cylindrical member 25 descends into the recess 30. The vertical position of the electrode 23 is at this time exactly at the level of the mating surfaces of the sheets 34 and 35. Hereafter current is switched on to the electrode 23 and the axle 15 is rotated, and simultaneously protective gas is supplied through the axle 15 via its inner part from the conduit 14, resulting in an oxygen-free state at the welding point, and the welded seam is formed. A copper ring 33 is attached to the lower surface of the cooler 11. Similarly, the upper surface of the jig 7 comprises a copper ring 32, and the sheets 34 and 35 to be joined, disposed between these cooling rings 32 and 33, are pressed closely together. The heat generated in the welding operation is transmitted to the copper cooling rings 33 and 32, and from there the heat conducted by conduction into the cooler 11, thus enabling adequate prevention of sagging of the melt generated in the welded seam. Once the welding head 10 has rotated about one turn, it may be lifted together with the cooling portion, and the welded seam is complete. Dissipation of heat generated during welding enables the welded pieces to be immediately workable, and the heat remaining in them causes no changes in shape.

It is clearly understood that the applications of the method of the invention are numerous. The method may be applied for joining various materials. The protective gases used in the welding may also vary. The apparatus used for implementing the method of the invention and its mechanisms may also vary quite widely. The cooler 11 may have a different physical form from that disclosed in the application. The shape of the welding head may also be modified within the scope of the inventive concept.

What is claimed is:

1. A method of welding superimposed thin sheets of material at the periphery of holes in the sheets of material, said method comprising:

supporting two sheets of material in superimposed relation between two heat-transfer rings which surround aligned holes in the sheets of material, positioning an electrode within the aligned holes in the sheets of material in facing relation with mating surfaces of the superimposed sheets of material around said holes, said sheets of material being initially supported on one of said heat-transfer rings, said electrode and the other of said heat-transfer rings being moved together to clams the sheets of material between the rings while bringing the electrode into position to face the mating surfaces of the superimposed sheets of material around said holes, and resiliently resisting movement of said other of said heat-transfer rings when clamping said sheets of material between said rings, rotating said electrode while supplying electric current thereto to melt the sheets of material at said mating surfaces around the periphery of the holes in the sheets of material to form a continuous weld seal at the periphery of the holes, said heat-transferings supporting said sheets of material during formation of said weld seal while concurrently conducting heat away from the sheets of material.

2. A method as claimed in claim 1, further comprising supplying a protective fluid around the electrode during the formation of the weld seam to prevent oxidation thereof.

3. A method as claimed in claim 1, further comprising transferring heat from one of said rings to a coolant during formation of said weld seam.

4. Apparatus for welding thin sheets of material at the periphery of holes in the sheets of material, said apparatus comprising:

a welding jig for supporting two thin sheets of material having aligned holes in superimposed relation, a welding machine facing said welding jig and including a welding head and a rotatable axle rotatable supporting said welding head for melting the sheets of material around the periphery of said holes to form a continuous weld seam thereat, and cooling means carried by said welding machine for cooling the sheets of material during formation of said weld seam, said cooling means comprising a heat transfer ring facing said sheets of material and surrounding said aligned holes therein, said welding machine having a welding position in which said heat transfer ring clamps said sheets of material against the welding jig and said welding head forms said weld seam, said cooling means further comprising a chamber for a coolant, said heat transfer ring being associated with said chamber to transfer heat to said coolant during formation of said weld seam, a further heat transfer ring positioned on said welding jig so that said sheets of material are clamped between the heat transfer rings when the welding machine is in said welding position, and means for guiding said welding machine to said welding position including a rotatable cylindrical member supported at an end of said axle, a guide supported by said welding jig and having a recess positioned to receive said cylindrical member in said welding position, said welding jig having a blind hole in which said guide is supported for displacement therein.

5. Apparatus as claimed in claim 4, further comprising means for displacing said welding machine between said welding position and a non-operative position in which the welding machine is spaced from said welding jig.

6. Apparatus as claimed in claim 5, wherein said means for displacing said welding machine comprises a hydraulic cylinder.

7. Apparatus as claimed in claim 4, comprising resilient means between said guide and said welding jig.

8. Apparatus as claimed in claim 4, wherein said welding head comprises an electrode disposed perpendicularly to an axis of said axle, and a nozzle supported by said axle and receiving an end of said electrode, and means for introducing a protective fluid into said axle for flow through said nozzle during formation of said weld seam.

9. Apparatus as claimed in claim 8, comprising means for longitudinally adjusting said welding electrode in said nozzle.

10. Apparatus as claimed in claim 8, comprising means for laterally adjusting the nozzle in said axle.

11. Apparatus as claimed in claim 4, wherein said chamber comprises a hollow cylinder surrounding said rotatable axle.

12. Apparatus as claimed in claim 4, further comprising clamp means supporting said rotatable cylindrical member from said rotatable axle for axial adjustment thereof.

* * * * *

UNITED STATES PATENT AND TRADEMARK OFFICE
CERTIFICATE OF CORRECTION

PATENT NO. : 5,801,353
DATED : SEPTEMBER 1, 1998
INVENTOR(S) : Timo Mauno Pirila It is certified that error appears in the above-indentified patent and that said Letters Patent is hereby corrected as shown below:

Title page item [22] change the PCT filing date from "May 3, 1997" to -- May 3, 1995--.

Signed and Sealed this

Twenty-ninth Day of December, 1998

Attest:

BRUCE LEHMAN

Attesting Officer      Commissioner of Patents and Trademarks